No. 747,362. PATENTED DEC. 22, 1903.
T. H. BERG.
HARVESTER REEL.
APPLICATION FILED JULY 31, 1902.
NO MODEL. 3 SHEETS—SHEET 1.

Witnesses.
A. H. Opsahl.
H. D. Kilgore.

Inventor.
Torkel H. Berg.
By his Attorneys
Williamson Merchant

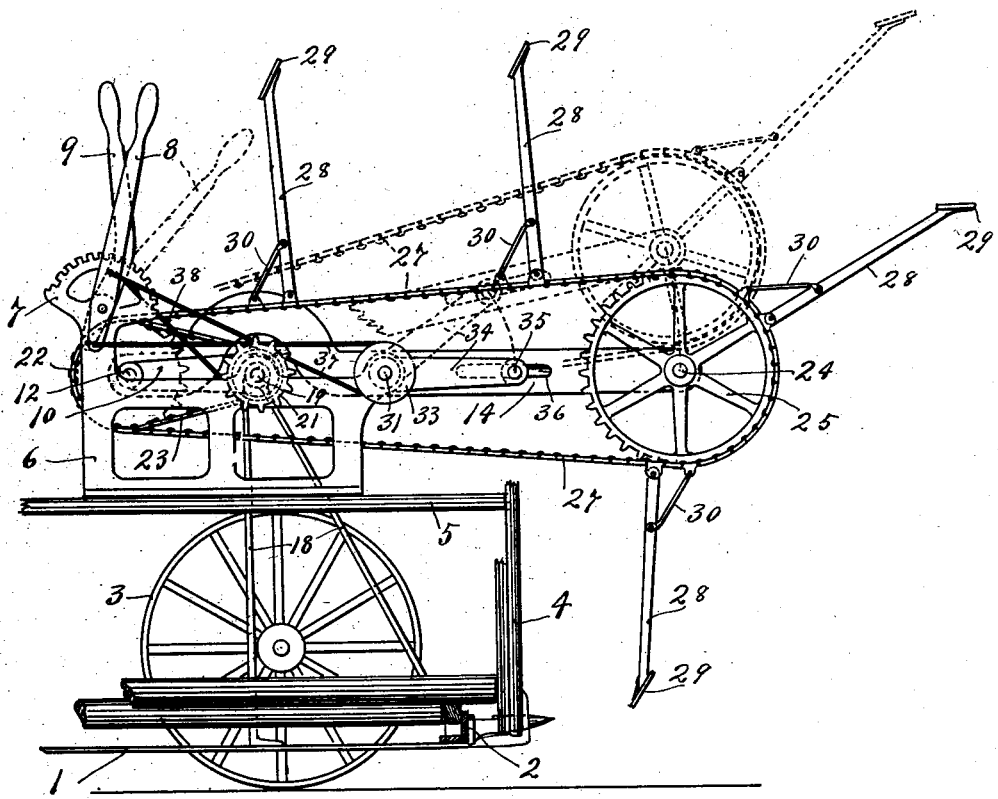

No. 747,362. PATENTED DEC. 22, 1903.
T. H. BERG.
HARVESTER REEL.
APPLICATION FILED JULY 31, 1902.
NO MODEL. 3 SHEETS—SHEET 3.

Witnesses.
A. H. Opsahl.
H. D. Kilgore

Inventor.
Torkel H. Berg.
By his Attorneys
Williamson & Merchant

No. 747,362. Patented December 22, 1903.

UNITED STATES PATENT OFFICE.

TORKEL H. BERG, OF CRAWFORD, SOUTH DAKOTA.

HARVESTER-REEL.

SPECIFICATION forming part of Letters Patent No. 747,362, dated December 22, 1903.

Application filed July 31, 1902. Serial No. 117,740. (No model.)

*To all whom it may concern:*

Be it known that I, TORKEL H. BERG, a citizen of the United States, residing at Crawford, in the county of Roberts and State of South Dakota, have invented certain new and useful Improvements in Harvester-Reels; and I do hereby declare the following to be a full, clear, and exact description of the invention, such as will enable others skilled in the art to which it appertains to make and use the same.

My invention has for its object to provide an improved reel for harvesters; and to this end it consists of the novel devices and combinations of devices hereinafter described, and defined in the claims.

The invention is illustrated in the accompanying drawings, wherein like characters indicate like parts throughout the several views.

Figures 1, 5:
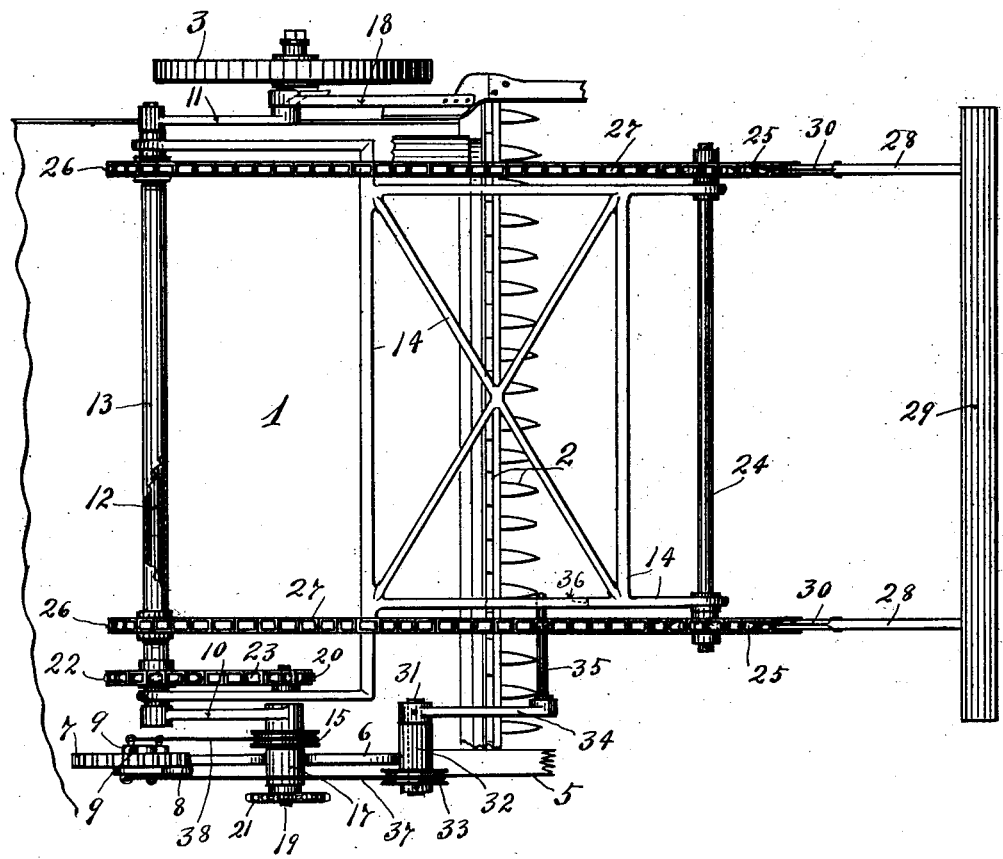
Figure 3:
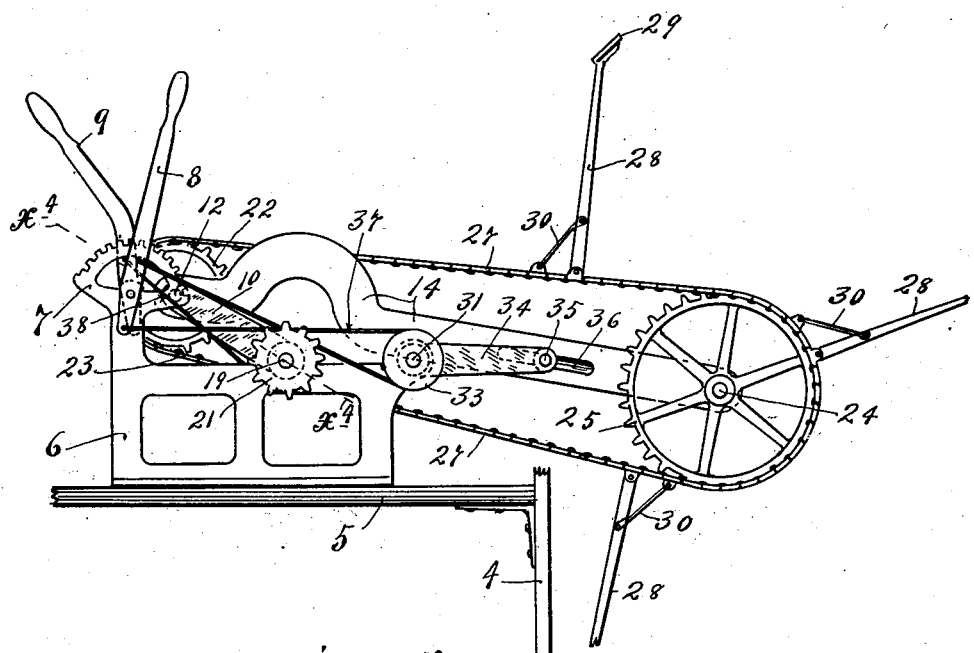
Figure 4:
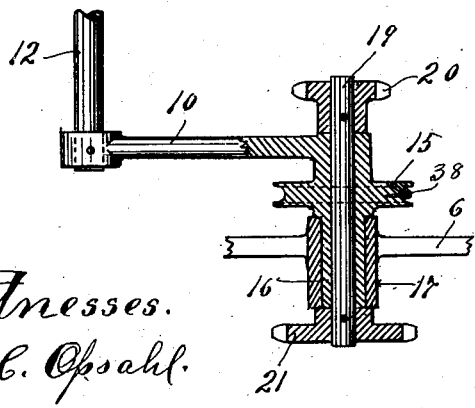

Figure 1 is a plan view showing a portion of a harvester and illustrating my improved reel applied thereto. Fig. 2 is a side elevation of the parts shown in Fig. 1, some parts being broken away. Fig. 3 is a view corresponding to Fig. 2, but with some parts removed and with the parts shown in different positions. Fig. 4 is a detail view, partly in plan and partly in transverse section, on the line $x^4 x^4$ of Fig. 3; and Fig. 5 is a detail corresponding somewhat to Fig. 3, with parts broken away and with some parts removed, so as to show portions of the lever connections which are covered up in Fig. 3.

Of the parts of the harvester shown, the numeral 1 indicates the platform, the numeral 2 the cutting-bar, the numeral 3 the grain-wheel, and the numeral 4 the elevator-frame, which is rigidly secured to the platform in the ordinary way and is provided with a horizontally-extended plank or shelf 5, which extends between the front and rear sides thereof, as best shown in Figs. 2 and 3.

The numeral 6 indicates a bearing-bracket which is bolted or otherwise rigidly secured to the plank 5. The bracket 6 is provided with a latch-arch 7, with which coöperates a pair of latch-levers 8 and 9, which operate independently the one with the other. A pair of oscillating arms 10 11 are pivotally connected at their free ends to a transverse shaft 12, upon which is loosely mounted a long sleeve 13 and to which is also pivoted one end of a swinging skeleton frame 14. The hub of the arm 10 is formed integral with or rigidly secured to a sheave 15, which is provided with a projecting sleeve 16, which sleeve 16 is journaled in a bearing 17 of the bracket 6, as best shown in Fig. 4. The corresponding end of the arm 11 is pivoted to a bracket or support 18, which rises from the grain-wheel end of the platform 1.

A short counter-shaft 19 is loosely journaled in and projects through the sleeve 16, sheave 15, and hub of the arm 10. At one end said shaft 19 carries a sprocket 20, and at its other end it carries a sprocket 21. The rotary sleeve 13 is provided with a sprocket 22, over which and the sprocket 20 of the shaft 19 runs a sprocket-chain 23. The counter-shaft 24 is loosely journaled in the free forward end of the swinging frame 14. At its ends the counter-shaft 24 is provided with relatively large sprocket-wheels 25, and in line therewith the sleeve 13 is provided with sprockets 26. Sprocket-chains 27 run over the alined sprockets 25 and 26. These sprocket-chains 27 carry projecting arms 28, arranged in pairs, with the transversely-opposite members connected at their outer ends by reel-blades 29, which are set at such bevel or angle to said arms that when they are dropped down into the grain they will stand approximately vertical—that is, will be moved as nearly as possible straight downward edgewise. Said arms 28 are pivoted at their inner ends to certain of the links of the chains 27 and are braced so that they will be properly projected from the chains by means of short truss-rods 30, pivotally connected to said arms and to other links of the said chains.

Forward of the counter-shaft 19 a short counter-shaft 31 is journaled in a bearing 32 of the frame 6. At its left-hand end the counter-shaft 31 is rigidly secured to a sheave 33, and at its right-hand end it is rigidly secured to the hub of an arm 34. The arm 34 is provided at its free end with a long laterally-projecting pin 35, which works freely in the slot 36, formed in the right-hand arm of the swinging frame 14.

The numeral 37 indicates a cord or flexible connection which is wound on and preferably secured to the sheave 33 and the ends of which are crossed and secured to the lever 8 on the opposite sides of its pivot. Likewise the numeral 38 indicates a cord or flexible connection which is wound on and secured to the sheave 15 and has its ends crossed and connected to the lever 9 on the opposite sides of its pivot. Now it is evident that by moving the levers 8 and 9, respectively, the arm 34 and the arms 10 11 may be oscillated. It is also evident that by oscillating the arm 34 the forward end of the swinging frame 14 may be raised and lowered, while the oscillations of the arms 10 11 will shift the said swinging frame from front to rear of the machine, or vice versa. By these two adjustments it is further evident that the operating portion of the reel—to wit, the descending and rearwardly-moving members of the reel-blades—may be brought to positions for the best action on the grain. It is further evident that the reel-blades are given a long sweep or travel from front to rear of the machine, so that they will continue their action on the grain for a much longer time than the blades of a rotary wheel and will much more certainly insure the delivery of the cut grain onto the platform of the harvester.

It will of course be understood that the invention above described is capable of considerable modification as to details of construction and arrangement of parts.

What I claim, and desire to secure by Letters Patent of the United States, is as follows:

1. The combination with a harvester, of a reel comprising a swinging frame, a pair of parallel oscillating arms supporting one end of said frame, an oscillating arm supporting the other end of said frame, the frame thus being mounted for both endwise and tilting movements, sprockets mounted on said frame, sprocket-chains running over said sprockets, said sprockets and sprocket-chains being arranged in pairs, reel-arms projecting from and carried by said sprocket-chains, and reel-blades connecting the ends of the transversely-opposite reel-arms, and means for driving said sprockets, substantially as described.

2. The combination with a harvester, of a reel comprising the swinging frame 14, the arms 10 11 pivotally supporting the rear end of said frame, the counter-shaft 19 working through the hub of said arm 10, the sheave 15 carried by said link 10, the lever 9 and cooperating latch-arch, the crossed connection 38 connecting said sheave to said lever, as described, the sleeve 13 journaled between the free ends of said arms 10 11 and on the rod 12, sprockets and a sprocket-chain for driving said sleeve 13 from said counter-shaft 19, the shaft 24 journaled in the forward end of said frame 14 and provided with sprockets 25, sprockets 26 on said sleeve 13, sprocket-chains 27 running over said sprockets 25 and 26, the reel-arms 28 carried by said chains, and the reel-blades 29 connecting said arms 28 in pairs, substantially as described.

In testimony whereof I affix my signature in presence of two witnesses.

TORKEL H. BERG.

Witnesses:
E. H. KELEHER,
F. D. MERCHANT.